US012498105B1

(12) United States Patent
Lavin

(10) Patent No.: US 12,498,105 B1
(45) Date of Patent: Dec. 16, 2025

(54) MODULAR LIGHTING FIXTURE AND MODULAR LIGHTING SYSTEM

(71) Applicant: Visual Comfort & Co., Houston, TX (US)

(72) Inventor: Sean Lavin, Winnetka, IL (US)

(73) Assignee: Visual Comfort & Co., Houston, TX (US)

(*) Notice: Subject to any disclaimer, the term of this patent is extended or adjusted under 35 U.S.C. 154(b) by 0 days.

(21) Appl. No.: 19/097,698

(22) Filed: Apr. 1, 2025

(51) Int. Cl.

| | |
|---|---|
| ***F21V 19/04*** | (2006.01) |
| ***F21S 8/04*** | (2006.01) |
| ***F21V 17/10*** | (2006.01) |
| *F21Y 103/30* | (2016.01) |

(52) U.S. Cl.
CPC .............. *F21V 19/04* (2013.01); *F21S 8/046* (2013.01); *F21V 17/101* (2013.01); *F21Y 2103/30* (2016.08)

(58) Field of Classification Search
CPC ........ F21V 19/04; F21V 17/101; F21V 21/26; F21S 8/063; F21S 8/046; F21Y 2103/30
See application file for complete search history.

(56) References Cited

U.S. PATENT DOCUMENTS

| | | | | |
|---|---|---|---|---|
| 11,512,841 | B1 * | 11/2022 | Jiang | F21V 21/22 |
| 12,034,288 | B2 | 7/2024 | Hack et al. | |
| 2014/0036495 | A1 * | 2/2014 | Gavriil | F21K 9/60 362/235 |
| 2015/0198311 | A1 * | 7/2015 | O'Brien | F21S 8/066 362/220 |
| 2018/0128464 | A1 * | 5/2018 | Sonneman | F21S 8/061 |
| 2018/0259169 | A1 * | 9/2018 | DuVernet | F21S 8/063 |
| 2019/0390828 | A1 * | 12/2019 | Kotovsky | F21V 13/04 |

* cited by examiner

*Primary Examiner* — Zheng Song
(74) *Attorney, Agent, or Firm* — MARSHALL, GERSTEIN & BORUN LLP

(57) ABSTRACT

A modular lighting fixture and a modular lighting system utilizing the modular lighting fixture, other lighting fixtures, and interchangeable components of lighting fixtures. The configuration of the modular lighting fixture can vary, and the modular lighting system can use one or more variations of the modular lighting fixture(s) and/or components thereof. When installed in an environment, the modular lighting fixture can be adjusted to satisfy aesthetic and functional preferences and requirements in the environment by employing interchangeable components. In some examples, multiple lighting fixtures of differing configurations can be used to create a lighting system that is functional and aesthetically pleasing.

20 Claims, 20 Drawing Sheets

MODULAR LIGHTING FIXTURE AND MODULAR LIGHTING SYSTEM

FIELD OF DISCLOSURE

The present disclosure generally relates to lighting fixtures, and more particularly, a modular lighting system including modular lighting fixtures with components that are interchangeable to meet the lighting needs of a user of the modular lighting system.

BACKGROUND

Residential buildings, commercial buildings, and industrial buildings are equipped with lighting systems that typically include several lighting fixtures configured to illuminate certain environments. In many cases, these lighting fixtures are used in various combinations to create contemporary sculpture-like statements in these environments.

SUMMARY

One example of the present disclosure is a modular lighting system. The modular lighting system includes a lighting fixture that includes: a stem fixture assembly adapted to connect to a junction box mounted to a ceiling; a rigid stem having a proximal end and a distal end, the rigid stem having a first length measured from the proximal end to the distal end; a curved arm housing one or more first lighting elements that face upwards, towards the stem fixture assembly, the curved arm having a first end and a second end and having a first arc length measured from the first end to the second end; and a transitional fitting operable to join the distal end of the rigid stem to the first end of the curved arm. The modular lighting system also includes a second rigid stem having a second length different from the first length, and a second curved arm housing one or more second lighting elements and having a second arc length different from the first arc length. The rigid stem is interchangeable with the second rigid stem, wherein interchanging the rigid stem with the second rigid stem changes a distance between the first end of the curved arm and the ceiling. The curved arm is additionally or alternatively interchangeable with the second curved arm such that the one or more second lighting elements face upwards, towards the stem fixture assembly, wherein interchanging the curved arm with the second curved arm changes a distance between the second end of the curved arm and the rigid stem.

Another example of the present disclosure is a lighting fixture configured to be connected to a ceiling. The lighting fixture includes: a rigid stem having a proximal end and a distal end, the rigid stem having a first length measured from the proximal end to the distal end; a curved arm housing one or more lighting elements that face upwards, towards the stem fixture assembly, the curved arm having a first end and a second end and having a first arc length measured from the first end to the second end; and a transitional fitting operable to join the distal end of the rigid stem to the first end of the curved arm. The rigid stem is interchangeable with a second rigid stem with a second length different from the first length, wherein interchanging the rigid stem with the second rigid stem changes a distance between the first end of the curved arm and the ceiling. The curved arm is alternatively or additionally interchangeable with a second curved arm housing one or more second lighting elements such that the one or more second lighting elements face upwards, wherein interchanging the curved arm with the second curved arm changes a distance between the second end of the curved arm and the rigid stem.

Another example of the present disclosure is a lighting fixture configured to be connected to a ceiling. The lighting fixture includes: a rigid stem having a proximal end and a distal end, the rigid stem having a first length measured from the proximal end to the distal end; a curved arm housing one or more lighting elements that face upwards, towards the stem fixture assembly, the curved arm having a first end and a second end and having a first arc length measured from the first end to the second end; and a transitional fitting operable to join the distal end of the rigid stem to the first end of the curved arm. The rigid stem is interchangeable with a second rigid stem with a second length different from the first length, wherein interchanging the rigid stem with the second rigid stem changes a distance between the first end of the curved arm and the ceiling. The curved arm is alternatively or additionally interchangeable with a second curved arm housing one or more second lighting elements such that the one or more second lighting elements face upwards, wherein interchanging the curved arm with the second curved arm changes a distance between the second end of the curved arm and the rigid stem. The transitional fitting includes one or more insertion prongs configured to be removably disposed in one or more openings, respectively, formed in the curved arm.

DETAILED DESCRIPTION

The present disclosure is generally directed to a modular lighting fixture and a modular lighting system utilizing the modular lighting fixture, other lighting fixtures, and interchangeable components of lighting fixtures. The configuration of the modular lighting fixture can vary, and the modular lighting system can use one or more variations of the modular lighting fixture(s) and/or components thereof. When installed in an environment, the modular lighting fixture can be adjusted to satisfy aesthetic and functional preferences and requirements in the environment by employing interchangeable components. In some examples, multiple lighting fixtures of differing configurations can be used to create a lighting system that is functional and aesthetically pleasing.

Figure 1:
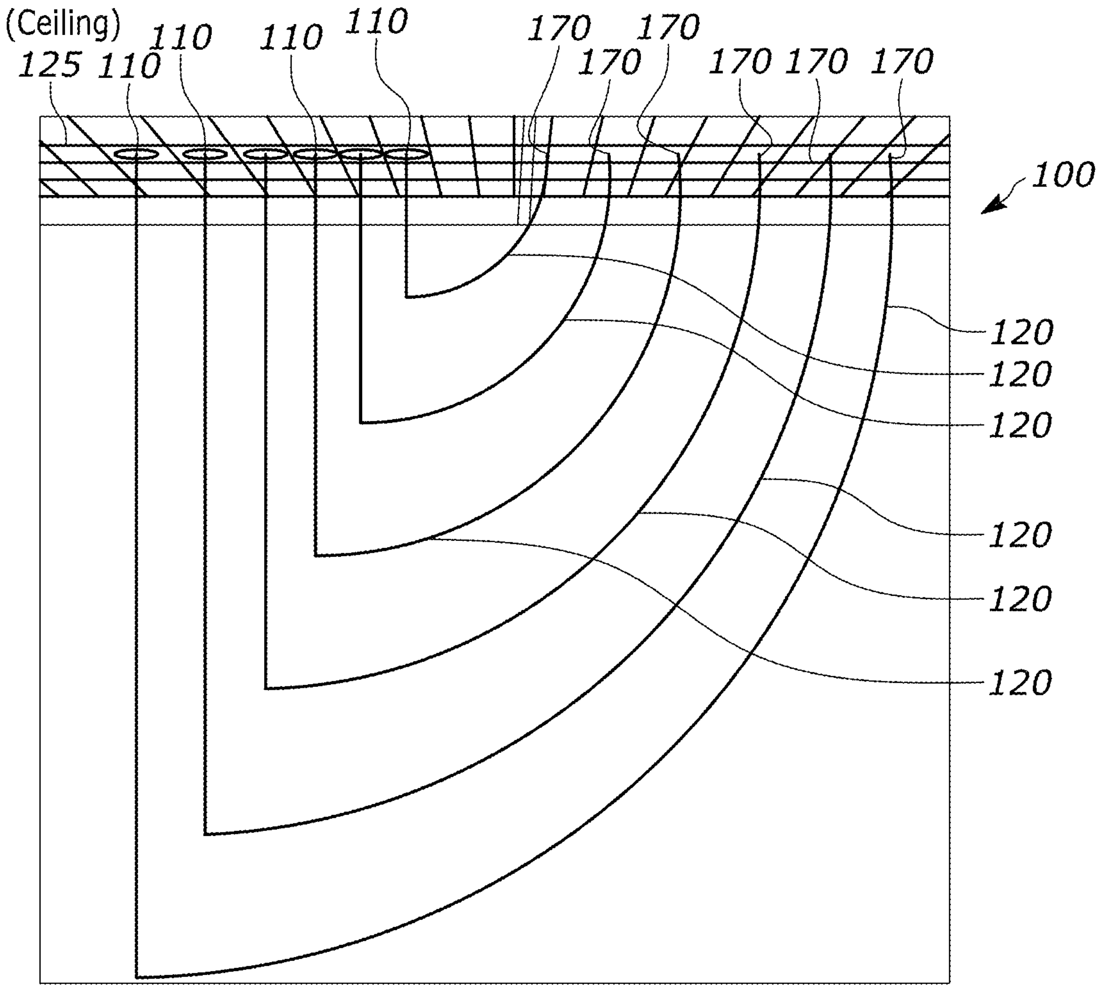
FIG. 1 is a perspective view of a first example of a modular lighting system in accordance with the teachings of the present disclosure, the modular lighting system including a plurality of lighting fixtures connected to first desired locations in the environment via a plurality of junction boxes, respectively.
Figure 2A:
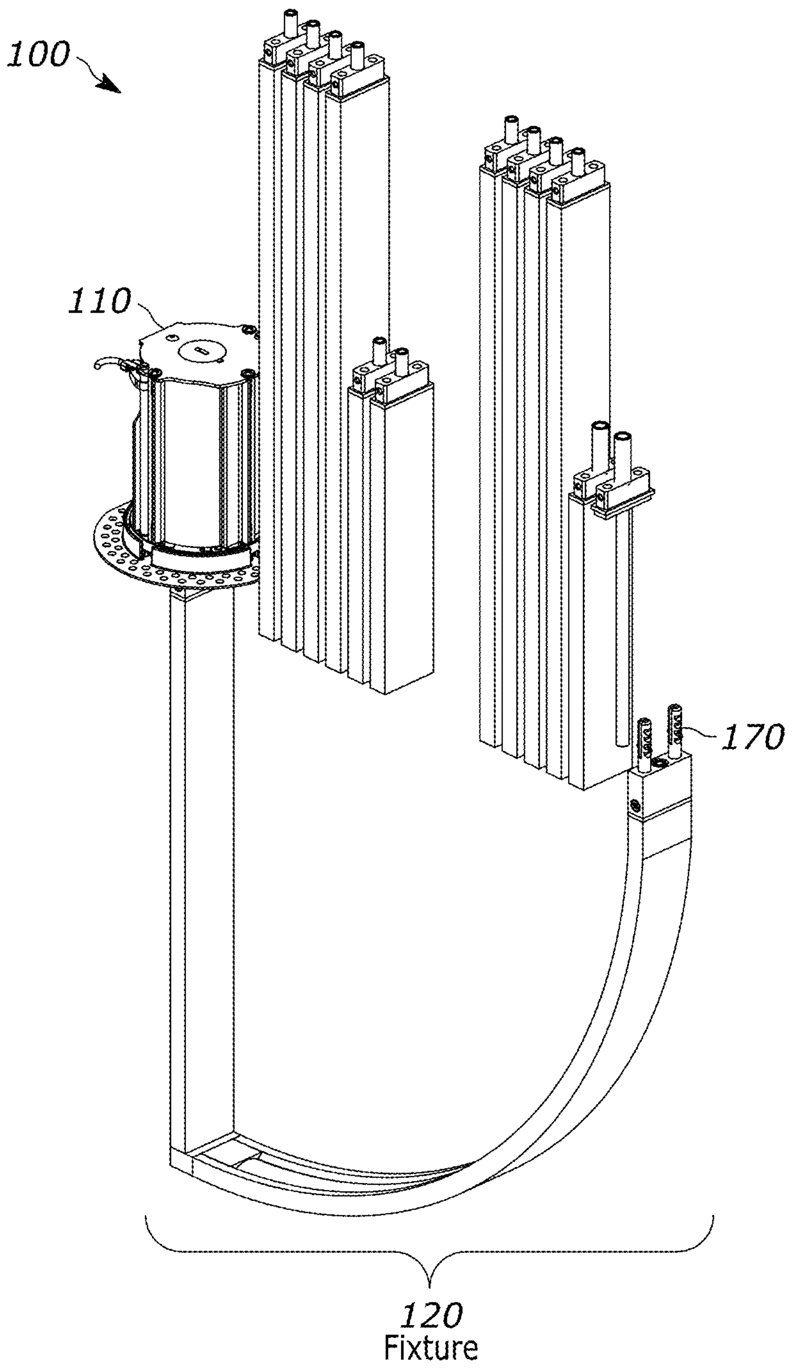
FIG. 2A is a perspective view of a single light fixture and a single junction box of the modular lighting system of FIG. 1, along with additional extending stems that are part of the modular lighting system of FIG. 1.
Figure 2B:
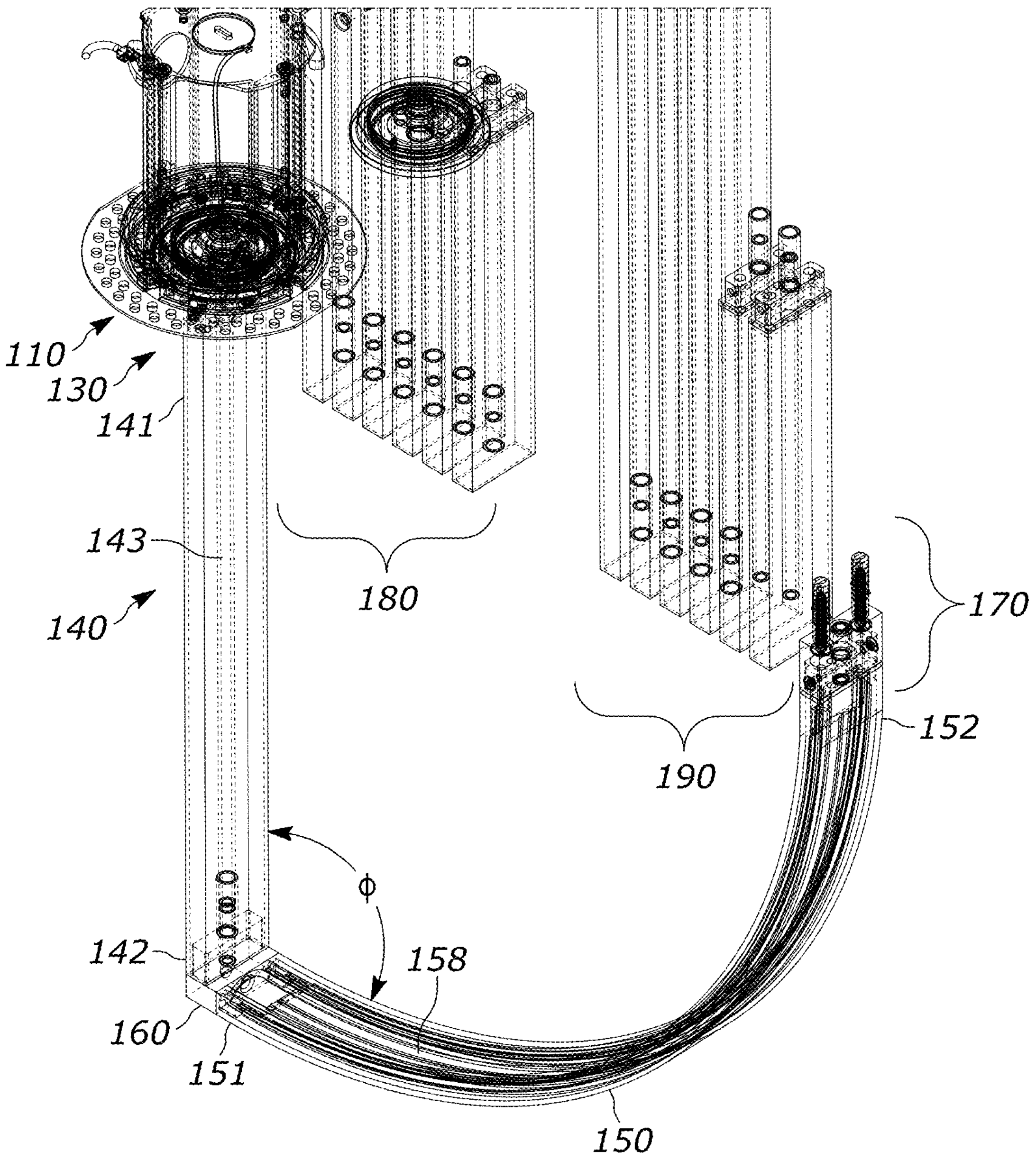
FIG. 2B is a close-up view of the lighting fixture of FIG. 2A.

FIGS. 1, 2A, and 2B depict one example of a modular lighting system 100 constructed in accordance with the teachings of the present disclosure. As illustrated in FIG. 1, the modular lighting system 100 includes a series of modular lighting fixtures 120 configured to be installed and secured to a desired surface (e.g., ceiling 125) within an environment to partially or fully illuminate the environment. Each lighting fixture 120 has a first end attached to the ceiling 125 via a junction box 110 that is mounted to the ceiling 125 and electrically powers the lighting fixture 120. Further details regarding the junction box 110 can be found in U.S. Pat. No. 12,034,288, which is hereby incorporated by reference in its entirety. Each lighting fixture 120 has a second end, spaced from the first end, attached to the ceiling 125 via a securing assembly 170 mounted to the ceiling 125, such that each lighting fixture 120 is mounted to the ceiling 125 in two discrete locations. In FIG. 1, the modular lighting system 100 includes six lighting fixtures 120. The six lighting fixtures 120 of FIG. 1 are similar in configuration, though not in size, and are aligned in a single plane that is perpendicular to the ceiling 125. In other examples, however, the modular lighting system 100 can include more or fewer lighting fixtures 120. For example, the modular lighting system 100 can include two lighting fixtures 120. And as will be discussed in greater detail below, the lighting fixtures 120 (and the components therein) are interchangeable with one another to change the aesthetic look of the environment and to illuminate the environment in a different manner.

FIGS. 2A and 2B, as well as FIGS. 3A, 3B, and 4-6B, illustrate one of the lighting fixtures 120 in greater detail. As illustrated in these FIGS., each lighting fixture 120 generally includes a stem fixture assembly 130, a rigid stem 140, a connecting rod 143, a curved arm 150, and a transitional fitting 160 coupled to the curved arm 150. The stem fixture assembly 130 is directly mounted to the junction box 110 and physically connects the rigid stem 140 (and the rest of the components of the lighting fixture 120) to the junction box 110. The rigid stem 140 has a proximal end 141 and a distal end 142. The connecting rod 143 extends entirely through the rigid stem 140 and attaches the rigid stem 140 to the stem fixture assembly 130. The curved arm 150 has a first end 151 and a second end 152. A lighting array 158 is carried by the curved arm 150 and includes one or more lighting elements. The lighting array 158 is situation such that the lighting elements face upward, toward the stem fixture 130. The transitional fitting 160 connects the distal end 142 of the rigid stem 140 to the first end 151 of the curved arm 150.

As best illustrated in FIGS. 3A and 4-6B, when the rigid stem 140 is connected to the junction box 110 via the stem fixture assembly 130, the rigid stem 140 extends downward from the stem fixture assembly 130, the junction box 110, and the ceiling 125. In this example, the rigid stem 140 extends downward along an axis S that is vertical and perpendicular to the ceiling 125. In other examples, however, axis S that is non-perpendicular to the ceiling 125. As also best illustrated in these FIGS., when the rigid stem 140 is connected to the junction box 110 via the stem fixture assembly 130 and when the curved arm 150 is connected to the rigid stem 140 via the transitional fitting 160, the curved arm 150 curves and faces upwards, away from the distal end 142 of the rigid stem 140 and back toward the ceiling 125.

As best illustrated in FIGS. 3A, 3B, and 4-6, the rigid stem 140 of each lighting fixture 120 includes a rigid wall 200 and an opening 204 defined by and extending through the rigid wall 200. In this example, the rigid wall 200 has a rectangular shape in cross-section, such that the opening 204 is a rectangularly shaped opening that extends through the rigid wall 200. In other examples, however, the rigid wall 200 can have a different shape in cross-section (e.g., a circular shape, a triangular shape), in which case the opening 204 can also have a different shape. The rigid stem 140 of each lighting fixture 120 also has a length L measured from the proximal end 141 to the distal end 142 (and vice-versa). In turn, the lighting fixture 120 has an overall length that includes the length L of the rigid stem 140 and has a distance D between the first end 151 of the curved arm 150 and the ceiling 125. It will be appreciated that the rigid stem 140 specifically illustrated in FIGS. 3A, 3B, and 4-6 has a first length while other rigid stems 140 in the modular lighting system 100 can have the same (first) length or any number of different lengths greater or less than the first length. For example, the rigid stem 140 can have a length L equal to 6", 12", 18", 24", 30", 36", 48", 60", or 72". As a result, and as will be discussed in greater detail below, swapping the rigid stem 140 having the length L for another rigid stem 140 having a different length will change the distance D between the first end 151 of the curved arm 150 and the ceiling 125.

Meanwhile, the curved arm 150 has an overall arc length AL that is measured from the first end 151 to the second end 152 and helps to define a distance $D_2$ between the second end 152 of the curved arm 150 and the rigid stem 140. Like the rigid stem 140, the curved arm 150 specifically illustrated in FIGS. 3A, 4, and 5 has a first arc length while the other curved arms 150 in the modular lighting system 100 can have the same (first) arc length or any number of different arc lengths greater or less than the first arc length. Moreover, the other curved arms 150 in the modular lighting system 100 can have a different radius of curvature than the curved arm 150 specifically illustrated in FIGS. 3A, 4, and 5. As a result, swapping the curved arm 150 having the overall arc length AL for another curved arm 150 having a different arc length will change the distance $D_2$ between the second end 152 of the curved arm 150 and the rigid stem 140. Further yet, as specifically illustrated in FIG. 2B, the curved arm 150 is oriented at an angle $\phi$ relative to the rigid stem 140. Generally speaking, the angle $\phi$ between the rigid stem 140 and the curved arm 150 will be constant, regardless of which rigid stem 140 in the modular lighting system 100 and which curved 150 in the modular lighting system 100 are employed, though it will be appreciated that the angle $\phi$ may vary depending on the exact configuration of the lighting fixture 120.

Figure 6A:
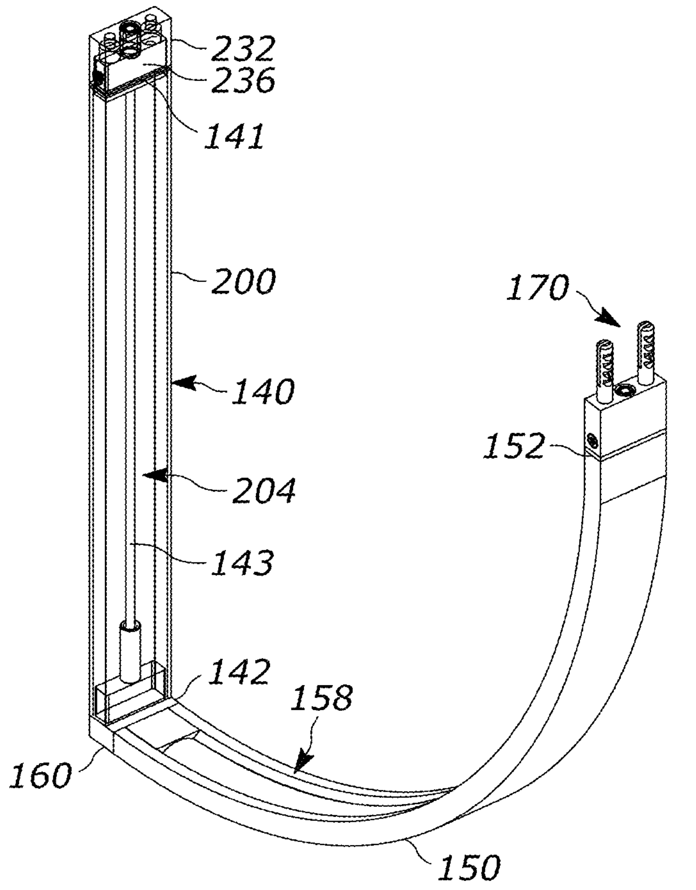
FIG. 6A is similar to FIG. 5 but with the rigid stem of the lighting fixture depicted transparently for illustrative purposes.
Figure 6B:
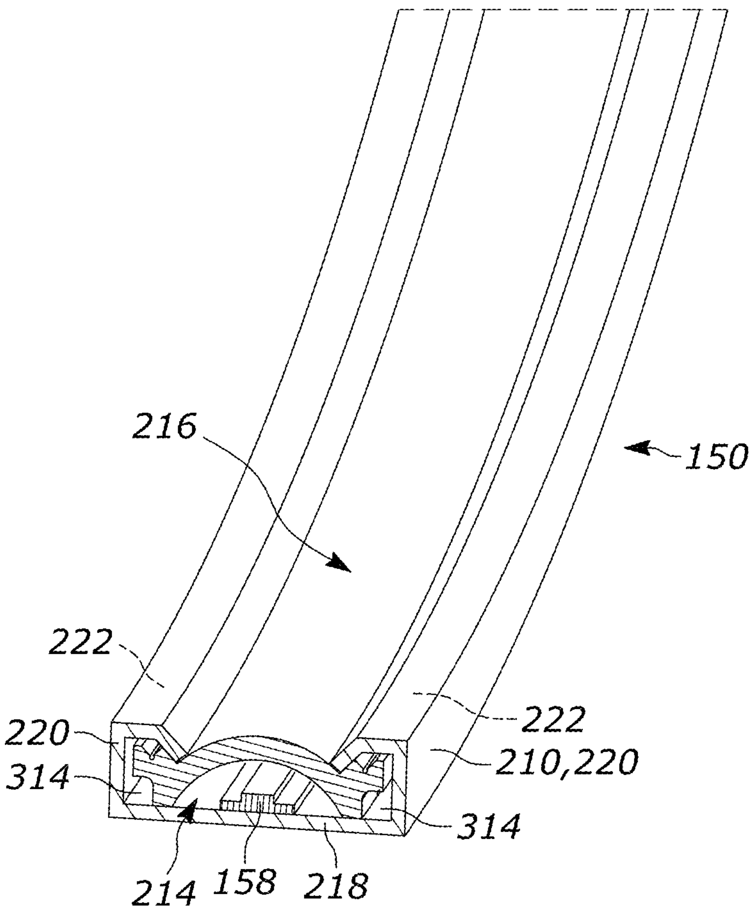
FIG. 6B is a cross-sectional view of the curved arm of the lighting fixture.
Figure 7A:
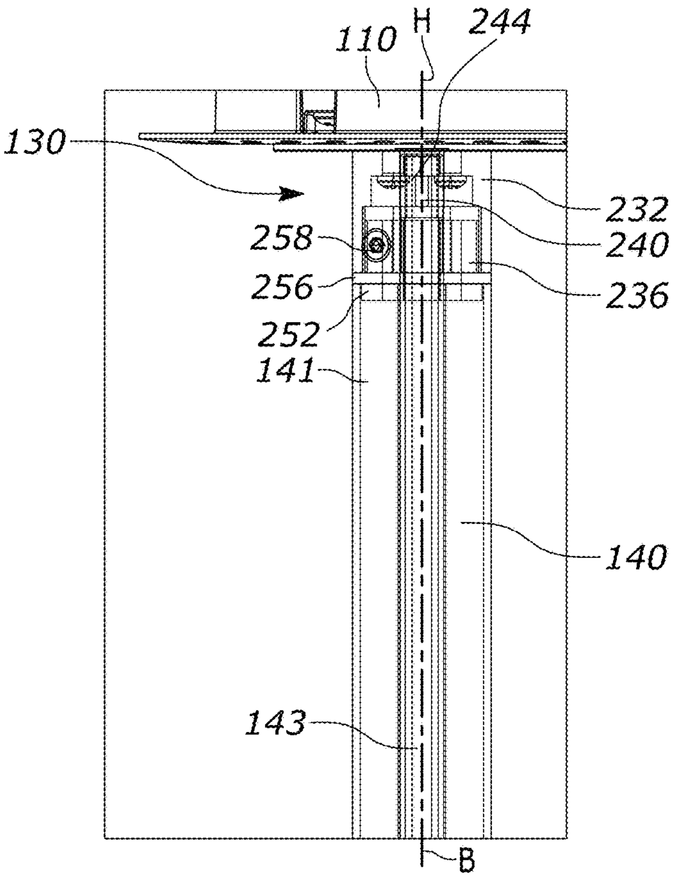
FIG. 7A is a perspective view of the bottom of the junction box and the top of the lighting fixture when connected to the junction box, but with the housing of the stem fixture assembly of the lighting fixture depicted transparently for illustrative purposes.
Figure 7B:
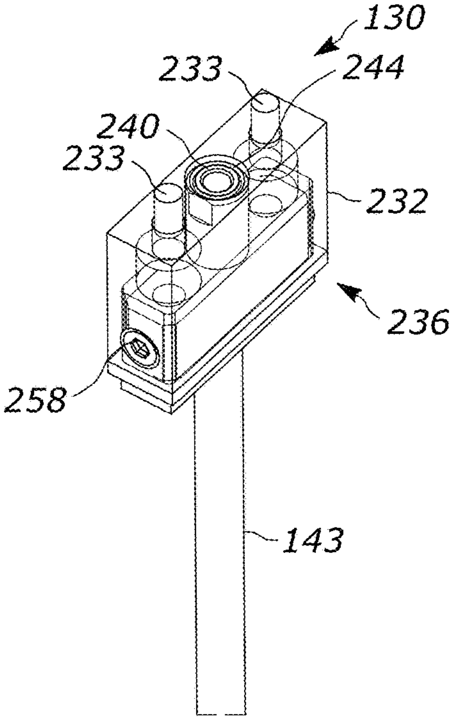
FIG. 7B is similar to FIG. 7A but with the rigid stem removed for illustrative purposes.
Figure 7C:
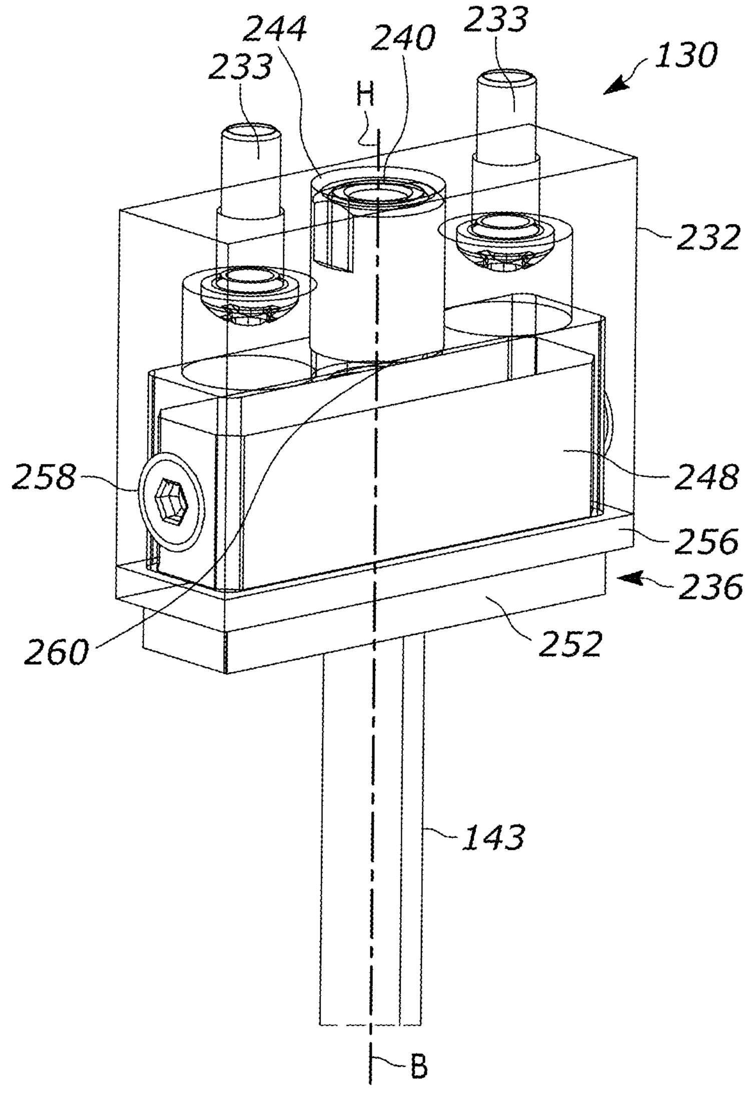
FIG. 7C is a close-up of FIG. 7B.
Figure 7D:
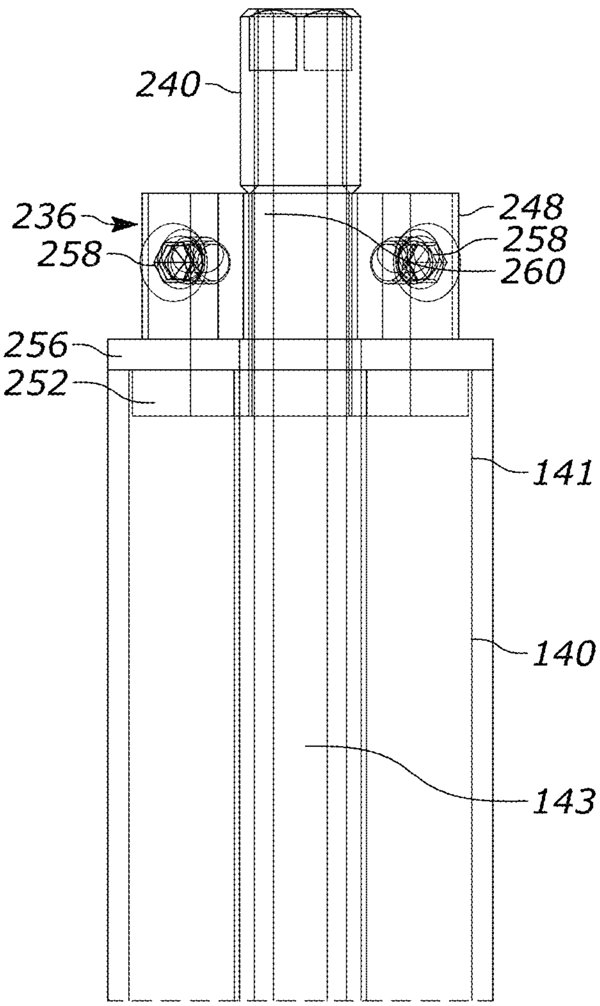
FIG. 7D is a plan view of FIG. 7C but with the housing of the stem fixture assembly removed for illustrative purposes.
Figure 8:
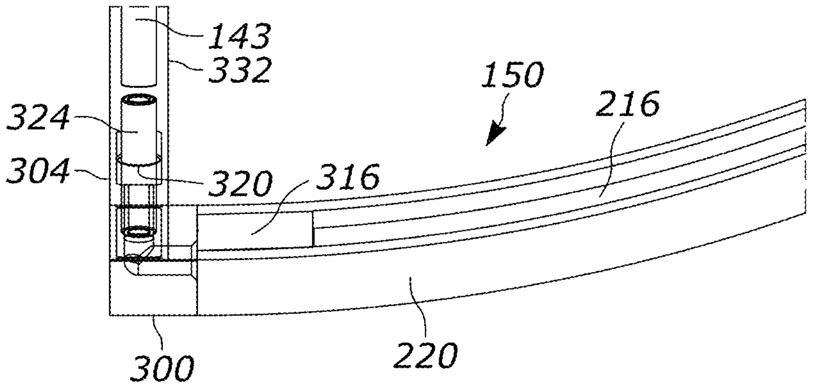
FIG. 8 is a perspective view of the transitional fitting of the lighting fixture that is utilized to connect the curved arm to the rigid stem, but with the transitional fitting depicted transparently for illustrative purposes.
Figure 9:
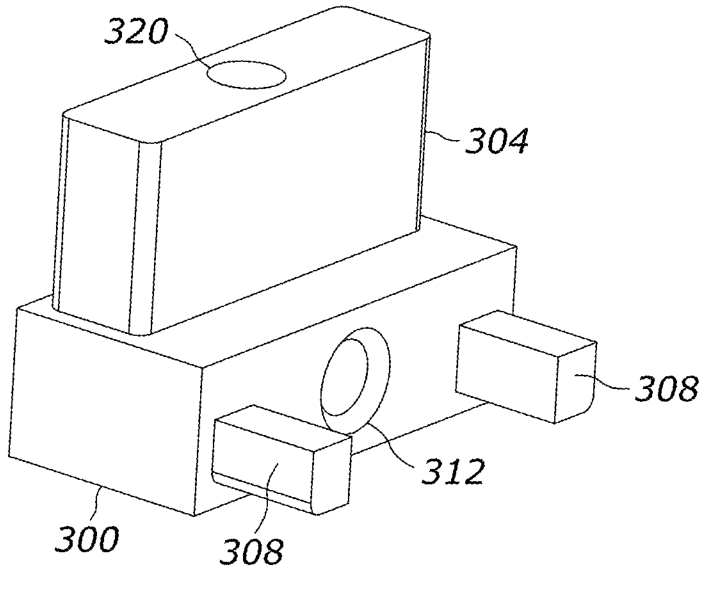
FIG. 9 is a close-up, perspective view of the transitional fitting of FIG. 8.
Figure 10:
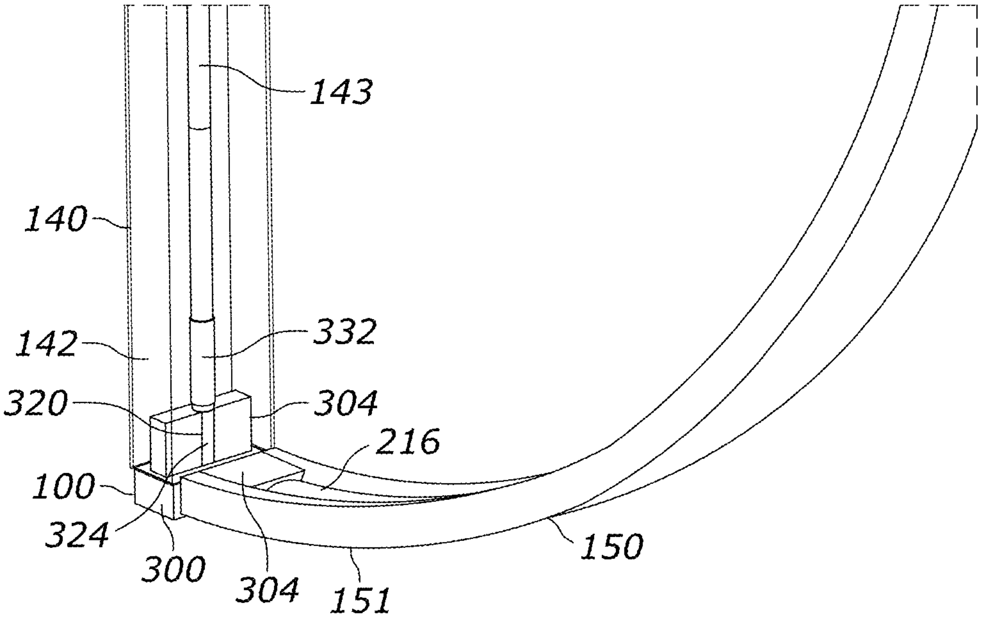
FIG. 10 is a first perspective view of how the transitional fitting of FIGS. 8 and 9 is utilized to connect the curved arm to the rigid stem.
Figure 11:
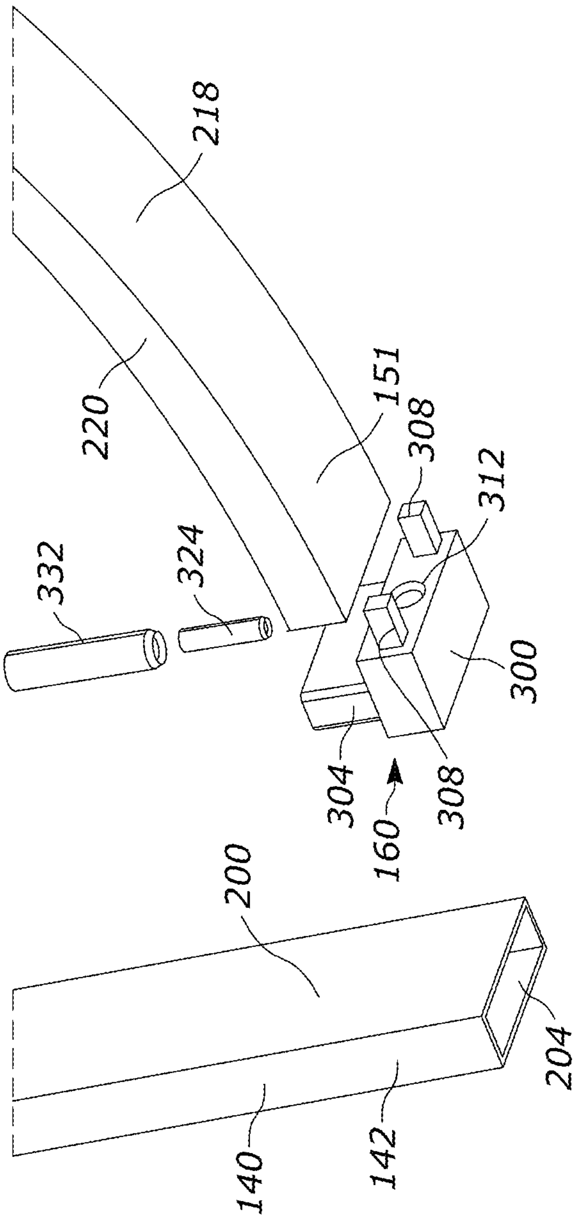
FIG. 11 is a second perspective view of how the transitional fitting of FIGS. 8 and 9 is utilized to connect the curved arm to the rigid stem.
Figure 12:
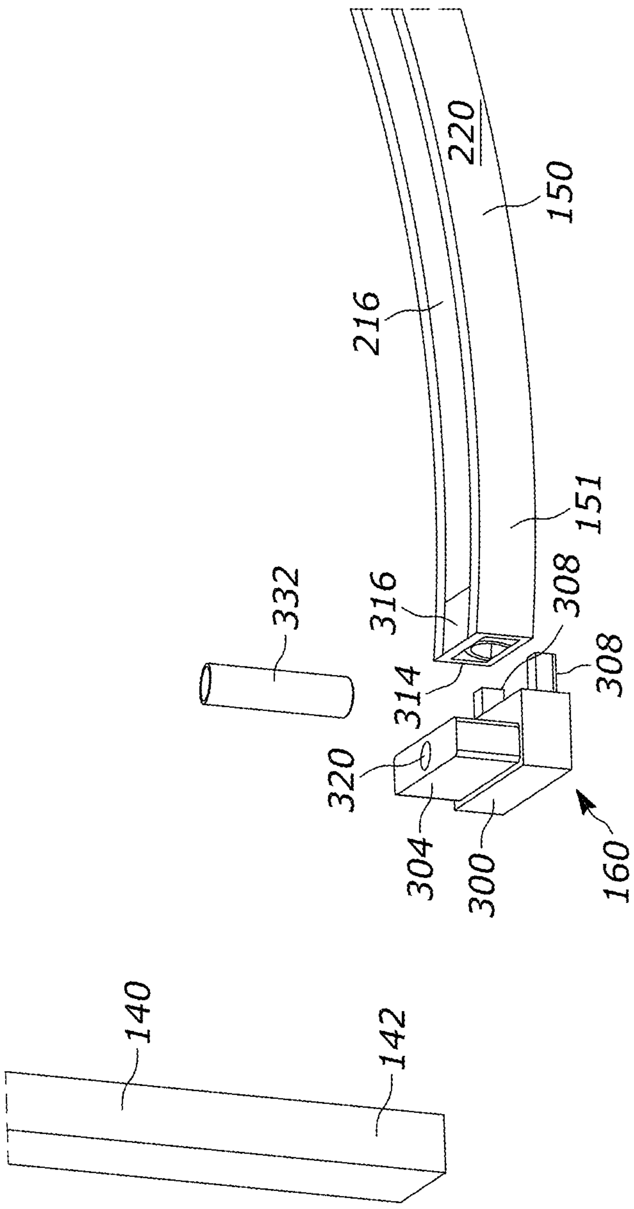
FIG. 12 is a third perspective view of how the transitional fitting of FIGS. 8 and 9 is utilized to connect the curved arm to the rigid stem.

As best illustrated in FIGS. 6A and 6B, the curved arm 150 of each lighting fixture 120 includes a housing 210, a cavity 214 formed in the housing 210, the lighting array 158 of the one or more lighting elements, which is disposed in the cavity 214, and a diffuser 216 at least partially disposed in the cavity 214. In this example, the housing 210 has a bottom wall 218, a pair of side walls 220 coupled to and extending outward (upward in the orientation shown in FIG. 6) from the bottom wall 218, and a pair of projections 222 coupled to and extending inward from the pair of side walls 220, respectively. Together, the bottom wall 218, the side walls 220, and the projections 222 define the cavity 214, which in this example is partially open and partially enclosed and has a quasi-W shape in cross-section, as illustrated in FIG. 6B. The lighting array 158 in this example is flexible, curved like the curved arm 150, and is directly coupled to the bottom wall 218 between a position immediately adjacent the first end 151 of the curved arm 150 and a position immediately adjacent the second end 152 of the curved arm 150. In this example, the lighting array 158 is seated directly against the bottom wall 218 and is centered between the side walls 220 and faces upward, away from the bottom wall 218, though the lighting array 158 can be positioned closer to one of the side walls 220. The diffuser 216, meanwhile, is positioned over the lighting array 158 and extends between a position immediately adjacent the first end 151 of the curved arm 150 and a position immediately adjacent the second end 152 of the curved arm 150. In this example, the diffuser 216 has an inverted U-shaped cross-sectional shape, with each projection 222 arranged to engage a portion of the diffuser 216 to retain the diffuser 216 in the cavity 214, and bottom portions of the diffuser 216 arranged to engage the bottom wall 218 of the housing 210. Finally, in this example, the diffuser 216 is made of a soft/flexible white silicone material, though in other examples, the diffuser 216 can be made of one or more different materials.

In this example, the lighting elements arranged on the array are light-emitting diodes (LEDs). The LEDs are spaced apart (either evenly or unevenly) between the first end 151 of the curved arm 150 and the second end 152 of the curved arm 150. Because the lighting array 158 of the lighting elements faces upward, the LEDs will emit light upwards, away from the bottom wall 218 and toward the diffuser 216, which will then serve to distribute the light within the environment (and, more particularly, toward the ceiling 125), thereby providing an indirect light output to the environment. Though the lighting elements are described herein as oriented on the concave side of the curved arm 150 such that they illuminate the ceiling, the position of the lighting elements should not be limited to that configuration. The lighting elements in the light 120 may instead be configured to illuminate away from the ceiling, on the convex side of the curved arm 150. Additionally, or alternatively, lighting elements may be present on one or more sides of the curved arm 150 or even on the rigid stem 140. All of these variables may be combined in the pursuit of a desired lighting effect.

Reference will now be made to FIGS. 4-7D to discuss further details about the stem fixture assembly 130. The stem fixture assembly 130 in this example generally includes a housing 232, a bushing 236, and a nut 240 coupled to the connecting rod 143. These components of the stem fixture assembly 130 interface with the junction box 110 and the proximal end 141 of the rigid stem 140. The housing 232 is directly connected to a cover of the junction box 110 via a plurality of fasteners 233. In this example, the housing 232 has a generally rectangular shape and includes a central aperture 244 that extends through the housing 232 along an axis H that is co-axial with the axis S of the rigid stem S. The central aperture 244 is sized and arranged to receive an end of the connecting rod 143. Meanwhile, the bushing 236 is coupled to the housing 232 such that the bushing 236 is at least partially disposed in the housing 232. More particularly, the bushing 236 has a first portion 248 disposed within and surrounded by the housing 232, a second portion 252 disposed outside of the housing 232 and disposed within the proximal end 141 of the rigid stem 140, and an interfacing portion 256 that is arranged between the first and second portions 248, 252 and is seated between an end of the housing 232 and the proximal end 141 of the rigid stem 140. One or more fasteners (e.g., securing screws) 258 are arranged to hold the first portion 248 of the bushing 236 within the housing 232. The bushing 236 also includes a central aperture 260 that extends through the bushing 236 along an axis B that is co-axial with the axis H (and, thus, the axis S). In other words, the central aperture 260 extends through each of the first, second, and interfacing portions 248, 252, and 256. The central aperture 260 is sized and arranged to receive a portion of the connecting rod 143 immediately adjacent the end of the connecting rod 143. It will be appreciated, however, that the central aperture 260 of the bushing 236 has a diameter that is smaller than a diameter of the central aperture 244 of the housing 232. This is because the nut 240, which in this example is threaded on the end of the connecting rod 143 and is seated against the first portion 248 of the bushing 236, has an outer diameter that is larger than an outer diameter of the connecting rod 143 and the diameter of the central aperture 260. In turn, the nut 240 is retained within the central aperture 244 of the housing 232 and helps to couple the connecting rod 143 to the housing 232, the rigid stem 140, and the junction box 110.

FIGS. 8-13 provide various views of the transitional fitting 160 and the components of the lighting fixture 120 that interface with that fitting 160, specifically the distal end 141 of the rigid stem 140 and the first end 151 of the curved arm 150.

As illustrated, the transitional fitting 160 includes a horizontal portion 300 and a vertical portion 304 that extends outward (in this case 90 degrees upward) from the horizontal portion 300. The horizontal portion 300 includes insertion prongs 308 and a central opening 312. The insertion prongs 308 extend outward and align with corresponding openings 314 located at the first end 151 of the curved arm 150 between the diffuser 216 and the side walls 220 (see FIG. 6B). The insertion prongs 308 are disposed in the openings 314, respectively, thereby connecting the transitional fitting 160 to the curved arm 150. Meanwhile, the first end 151 of the curved arm 150 also includes a cover plate 316 that obscures the openings 314 and the insertion prongs 308 when the lighting fixture 120 is fully assembled. The cover plate 316 can also help to retain the diffuser 216 within the cavity 214 of the curved arm 150 At the same time, the opening 312 of the transitional fitting 160 allows electrical wiring (e.g., wiring 111 in FIGS. 3B and 15) to pass from the junction box 110, through the transitional fitting 160, and to the lighting elements in the array 158.

The vertical portion 304 of the transitional fitting 160 is sized to fit within the distal end 142 of the rigid stem 140. In other words, the relative size of the distal end 142 of the rigid stem 140 and the vertical portion 304 of the transitional fitting 160 allows the distal end 142 of the rigid stem 140 to receive and surround the vertical portion 304. The vertical portion 304 includes an opening 320 which is sized to accept an alignment rod 324 of the stem fixture assembly 130. When the alignment rod 324 is fully inserted into the opening 320 of the vertical portion 304, the alignment rod 324 extends outward from the vertical portion 304. In other words, a portion of the alignment rod 324 is disposed outside of the vertical portion 304. In the present example, the portion of the alignment rod 324 that is disposed outside of the vertical portion 304 is approximately half the length of the alignment rod 324. This portion has an outer diameter which matches an outer diameter of the connecting rod 143.

As best illustrated in FIGS. 8 and 10-12, the stem fixture assembly 130 also includes a sheath 332 that helps to connect the connecting rod 143 to the fitting 160 (and to the curved housing 150). More particularly, the sheath 332 couples the connecting rod 143 to the alignment rod 324. In this example, the sheath 332 is sized to receive a bottom end of the connecting rod 143 and a top end of the alignment rod 324 so as to connect the connecting rod 143 to the alignment rod 324 (and, in turn, the fitting 160). In some examples, the inner surface of the sheath 332 can be threaded and can engage threaded outer surfaces of the connecting rod 143 and the alignment rod 324. In some examples, the connecting rod 143 and the alignment rod 324 can be press fit into the sheath 332. Moreover, in this example, the sheath 332 has an outer diameter that is larger than an outer diameter of the opening 320 of the vertical portion 304. In turn, the sheath 332 holds the connecting rod 143 within the transitional fitting 160.

In the present example, the connection between the transitional fitting 160 and the curved arm 150 is strengthened by welding the horizontal portion 300 of the transitional fitting 160 to the first end 151 of the curved arm 150. Alternatively, or additionally, adhesive can be applied to the first end 151 and the insertion prongs 308, and/or other portions of the horizontal portion 300, to secure the transitional fitting 160 to the curved arm 150. Beneficially, the cover plate 316 may obscure weld lines or other signs of attachment between the transitional fitting 160 and the curved arm 150.

Figure 13:
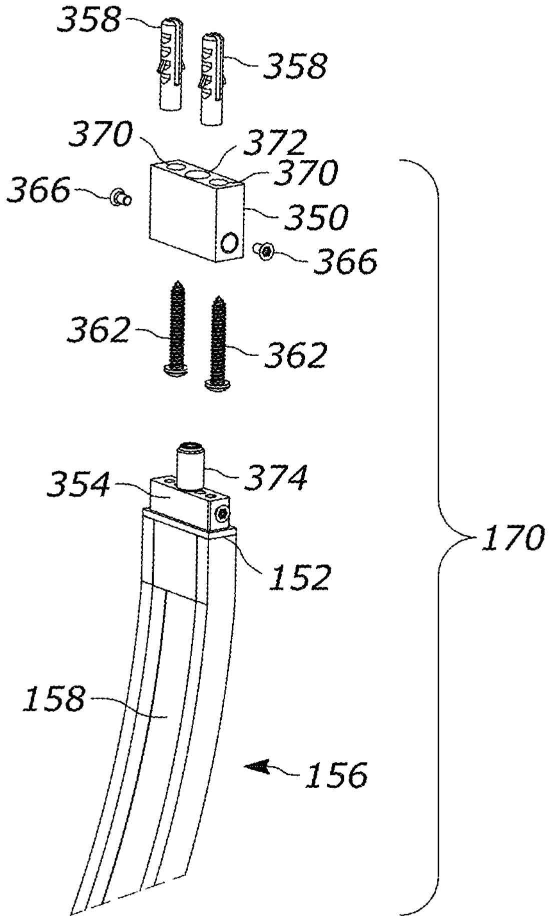
FIG. 13 is an exploded view of the standoff assembly of the lighting fixture for connecting the lighting fixture to a second desired location in the environment.
Figure 14:
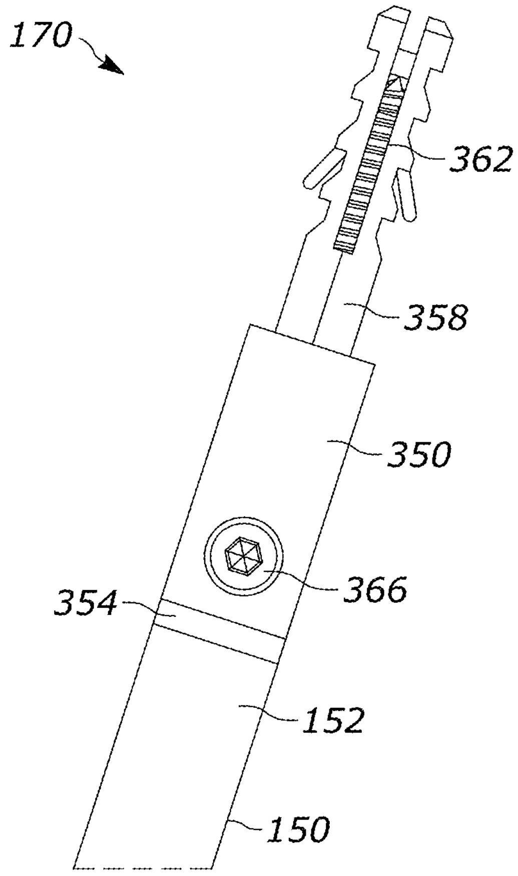
FIG. 14 is an end view of the standoff assembly as assembled.

The securing assembly 170 is shown in greater detail in FIGS. 13 and 14. The securing assembly 170 is a standoff assembly that attaches the curved arm 150 of the lighting fixture 120 to the ceiling 125 (at least in this example) and includes a standoff housing 350, a standoff bushing 354, securing connectors 358 extending outward from the standoff housing 350, and screws 362. The standoff housing 350 is substantially similar to the housing 232 of the stem fixture assembly 130. The standoff housing 350 is directly connected to the ceiling 125 via the securing connectors 358 and the screws 362, which are inserted into the securing connectors 358, respectively. The standoff bushing 354 is substantially similar to the bushing 236 of the stem fixture assembly 130 and is disposed within and surrounded by the standoff housing 350. The standoff bushing 354 is also secured to the second end 152 of the curved arm 150. Fasteners (e.g., screws) 366 like the fasteners 258 affix the housing 350 to the standoff bushing 354, while the screws 362 hold the securing connectors 358 to the standoff housing 350. The screws 362 emerge from side holes 370 formed in the standoff housing 350 and are threaded into the securing connectors 358.

As best illustrated in FIG. 14, the standoff housing 350 also includes a central hole 372 that is sized to receive a rod 374 between the side holes 320. The rod 374 is coupled to and extends outward from the standoff bushing 354 and can be used to pass electrical wiring from the ceiling to the curved arm 150 (or vice-versa), thereby allowing the lighting array 158 to be powered from the second end 152. Alternatively, or additionally, the central hole 372 may receive and surround a securing line (e.g., wire) that reinforces the physical connection between the lighting fixture 120 and the ceiling 125 at the second end 152 of the curved arm 150.

As briefly discussed above in connection with FIGS. 1, 2A, and 2B, the modular lighting system 100 can also include one or more additional rigid stems 140 that are interchangeable with the rigid stem 140 of the lighting fixture 120 depicted in FIGS. 3A, 4, 5, and 6A. The additional rigid stems 140 can be assembled as part of a separate lighting fixture 120 or can be separate components (i.e., separated from the other components of the lighting fixture 120). The additional rigid stems 140 are structurally and functionally identical to the rigid stem 140 but for the fact that the additional rigid stems 140 have different lengths than the rigid stem 140. For example, one of the additional rigid stems 140 can have a second length that is greater than the length L of the rigid stem 140, and another one of the additional rigid stems 140 can have a third length that is greater than the second length. It will be appreciated that interchanging the rigid stem 140 with one of the additional rigid stems 140 having a different length will change the overall length of the lighting fixture 120 as well as the distance D between the first end 151 of the curved arm 150 and the ceiling 125. For example, interchanging the rigid stem 140 with the additional rigid stem 140 having the second length or the third length serves to increase the overall length of the lighting fixture 120 and increases the distance D between the first end 151 of the curved arm 150 and the ceiling 125.

The modular lighting system 100 can also include one or more additional curved arms 150 that are interchangeable with the curved arm 150 of the lighting fixture 120 depicted in FIGS. 3A, 4, 5, and 6A. The additional curved arms 150 are structurally and functionally identical to the curved arm 150 but for the fact that the additional curved arms 150 have different arc lengths than the curved arm 150. For example, one of the additional curved arms 150 can have a second arc length that is greater than the arc length AL of the curved arm 150, and another one of the additional curved stems 150 can have a third arc length that is greater than the second arc length. It will be appreciated that interchanging the curved arm 150 with one of the additional curved arms 150 having a different arc length will change the distance $D_2$ between the second end 152 of the curved arm 150 and the rigid stem 140 (as well as the stem fixture assembly 130). For example, interchanging the curved arm 150 with the additional curved arm 150 having the second arc length or the third arc length serves to increase the distance $D_2$ between the second end 152 of the curved arm 150 and the rigid stem 140. It will be appreciated that the distance $D_2$ can be changed independently of the distance D (and vice-versa), though both distances D, $D_2$ can be simultaneously changed by simultaneously interchanging the rigid stem 140 and the curved arm 150.

Figure 16:
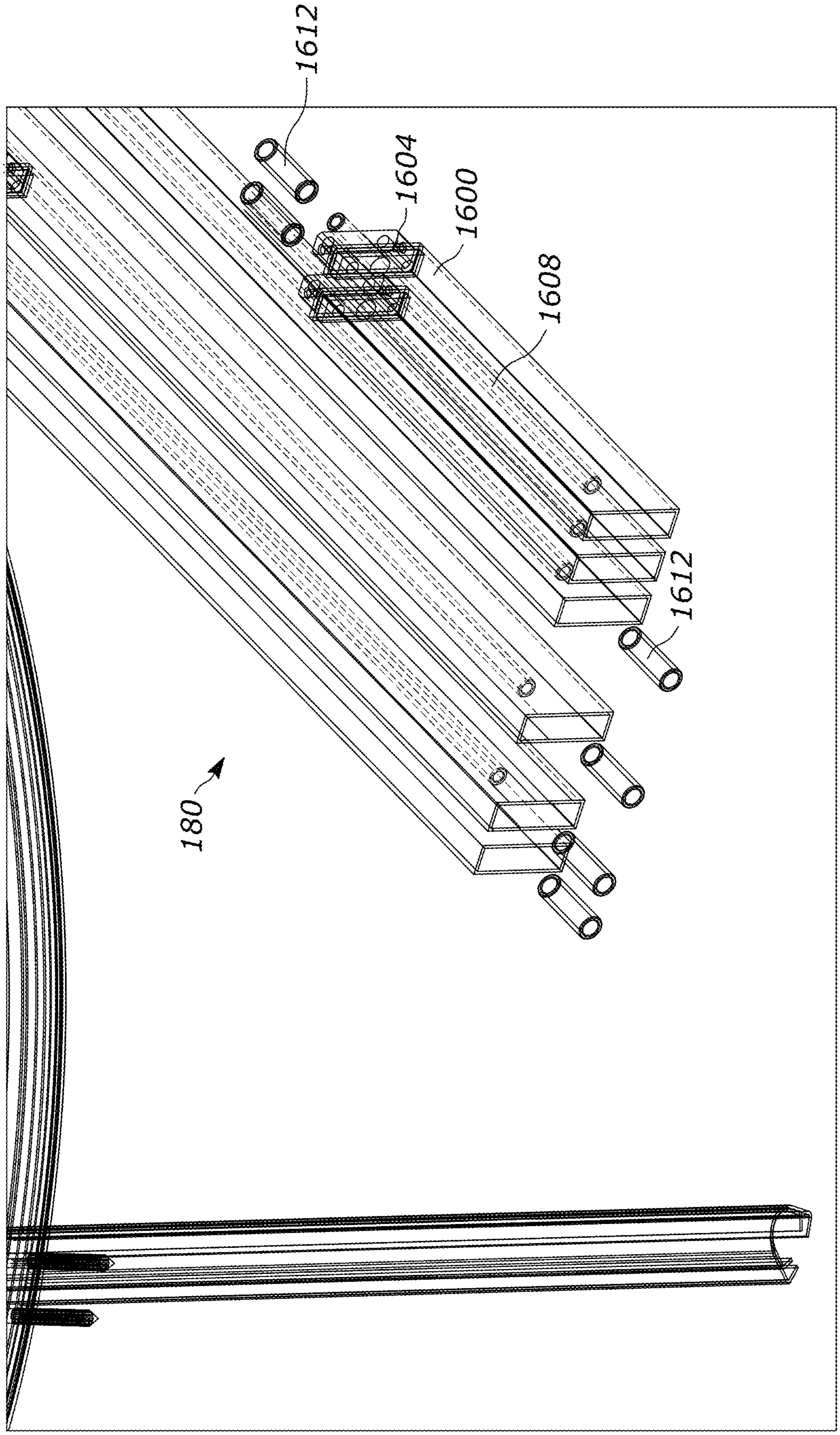
FIG. 16 is a close-up perspective view of the additional extending stems of FIGS. 2A and 2B.

In some examples, and as illustrated in FIGS. 2A, 2B, and 16, the modular lighting system 100 includes a plurality of first extender stems 180 as well as a plurality of second extender stems 190. The first extender stems 180 are attachable to the stem fixture assembly 130 and the proximal end 141 of the rigid stem 140 to increase the distance D between the first end 151 of the curved arm 150 and the ceiling 125. Stated another way, the first extender stems 180 interface (e.g., connect to) the proximal end 141 of the rigid stem 140 so that the distal end 142 of the rigid stem 140 is further away from the stem fixture assembly 130 and in turn further away from the ceiling 125. The first extender stems 180 can include stems of one or more different lengths. For example, the first extender stems 180 can include stems of three different lengths, which can in turn be used to change the distance D between the first end 151 of the curved arm 150 and the ceiling 125 in three different ways. Meanwhile, the second extender stems 190 are attachable to the curved arm 150 to increase a distance between the second end 152 of the curved arm 150 and the ceiling 125. More particularly, the extender stems 190 interface with (e.g., connect to) the second end 152 of the curved arm 150. Like the extender stems 180, the extender stems 190 are available in one or more lengths. In some examples, two or more extender stems 180, 190 can be used with either or both the rigid stem 140 and the curved arm 150. It will be appreciated that the varied combinations of extender stems 180, 190, the rigid stem 140, and the curved arm 150 result in many possible configurations of lighting fixtures 120.

Figure 15:
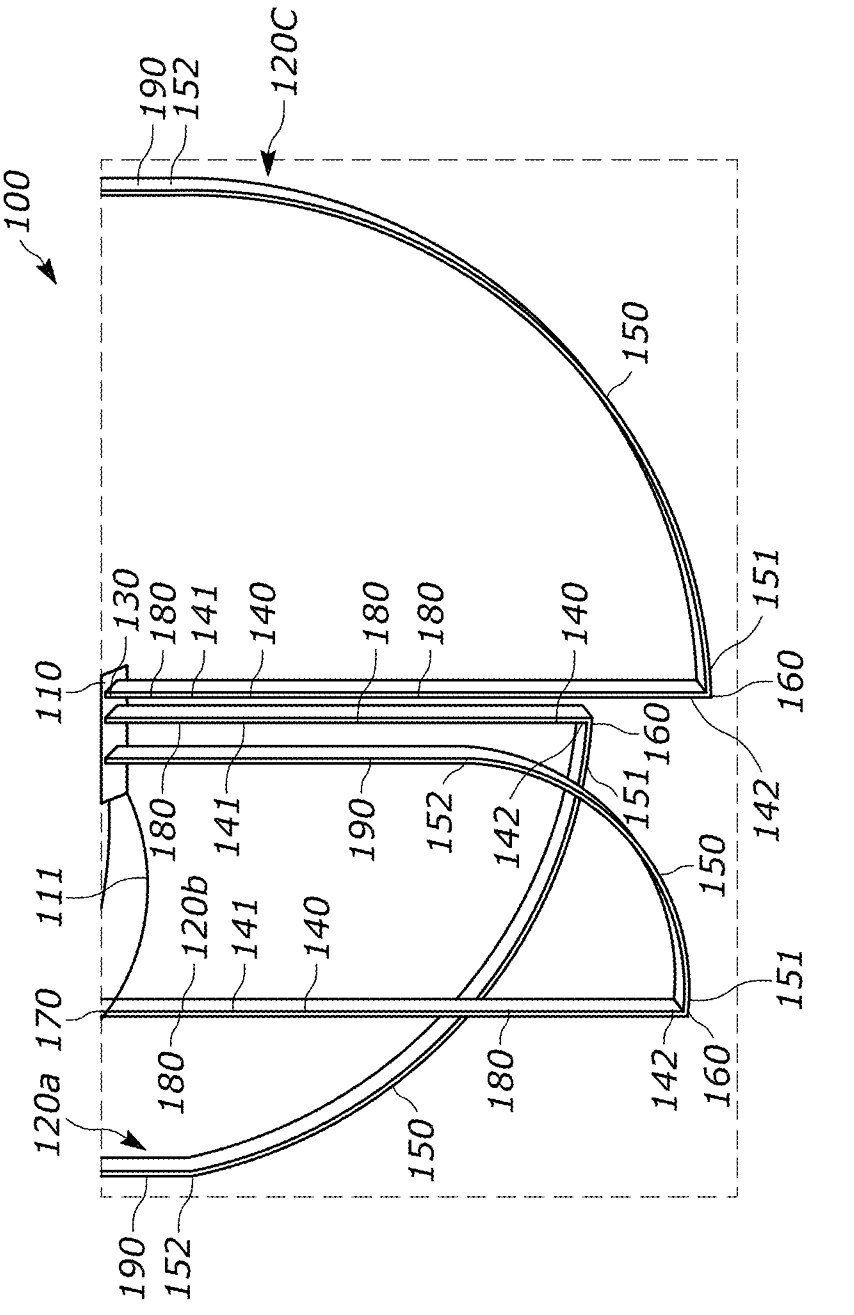
FIG. 15 is a perspective view of a second example of a modular lighting system in accordance with the teachings of the present disclosure, the modular lighting system including a plurality of lighting fixtures of different sizes, shapes, and orientations.

In one example, the modular lighting system 100 may include a single lighting fixture 120 and a single junction box 110. In another example, the modular lighting system 100 may include two or more lighting fixtures 120, each with a rigid stem 140, a curved arm 150, and a standoff assembly 170 attached to a second end 152 of the curved arm 150 or to an extender stem 190 attached to the second end 152 of the curved arm 150. For example, as shown in FIG. 15, the lighting system 100 can include three lighting fixtures 120*a*, 120*b*, 120*c* arranged in the system 100 in a way that is aesthetically pleasing to a consumer or user, with the lighting fixture 120*b* arranged "backwards" or "inverted" relative to the two other lighting fixtures 120*a*, 120*c*. Each lighting fixture 120*a*, 120*b*, 120*c* has one end connected to the ceiling 125 via a respective stem fixture assembly 130 coupled to a junction box 110 and another end connected to the ceiling 125 via a respective a standoff assembly 170 at a point separated a distance from the junction box 110 along the ceiling 125. As with the other light described herein, each of the lighting fixtures 120*a*, 120*b*, 120*c* includes the transitional fitting 160 that joins a respective distal end 142 of the rigid stem 140 to a respective first end 151 of the curved arm 150. In the example shown in FIG. 15, the lighting fixture 120*b* is attached to the same junction box 110 used by the two other lighting fixtures 120*a*, 120*c*. In other examples, however, the lighting fixtures 120*a*, 120*b*, 120*c* can be attached to two or three different junction boxes 110.

Figure 3A:
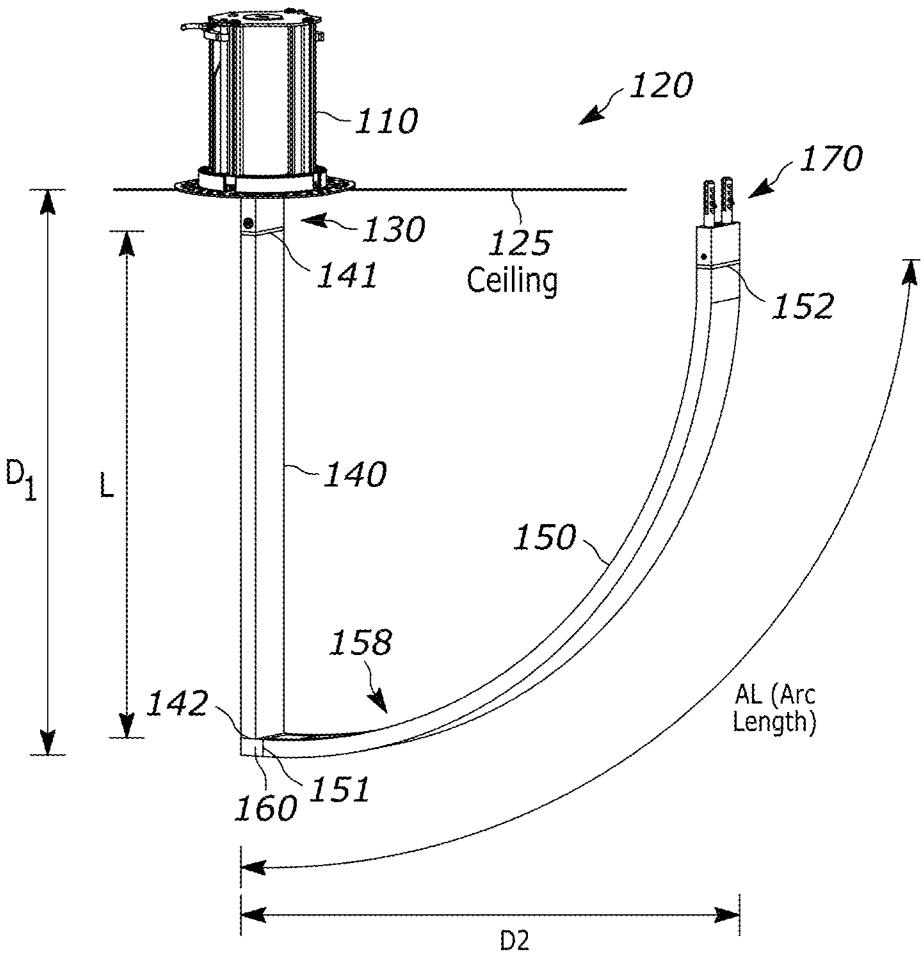
FIG. 3A is a front perspective view of the lighting fixture and junction box of FIGS. 2A and 2B.
Figure 3B:
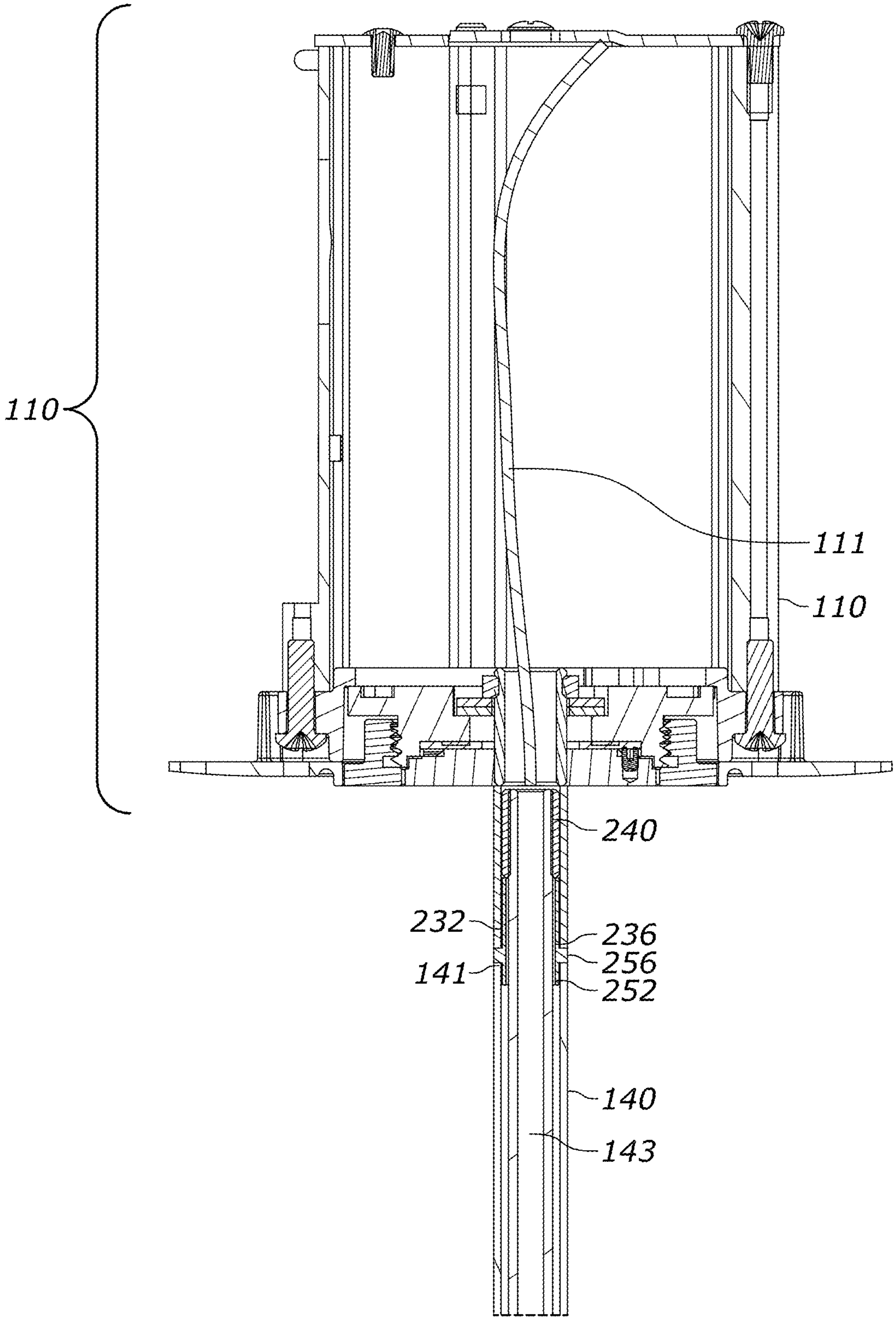
FIG. 3B is a partial, cross-sectional view of the bottom of the junction box and the top of the lighting fixture when connected to the junction box.
Figure 4:
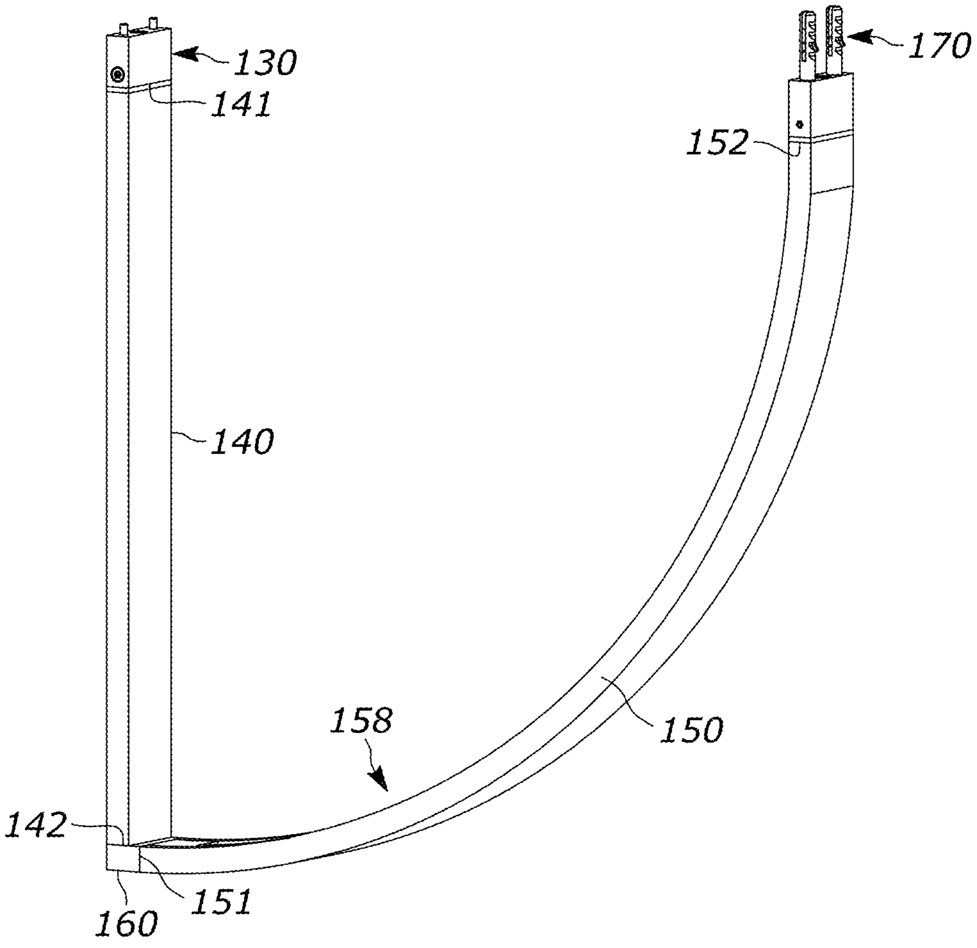
FIG. 4 is similar to FIG. 3A but with the junction box removed for clarity.
Figure 5:
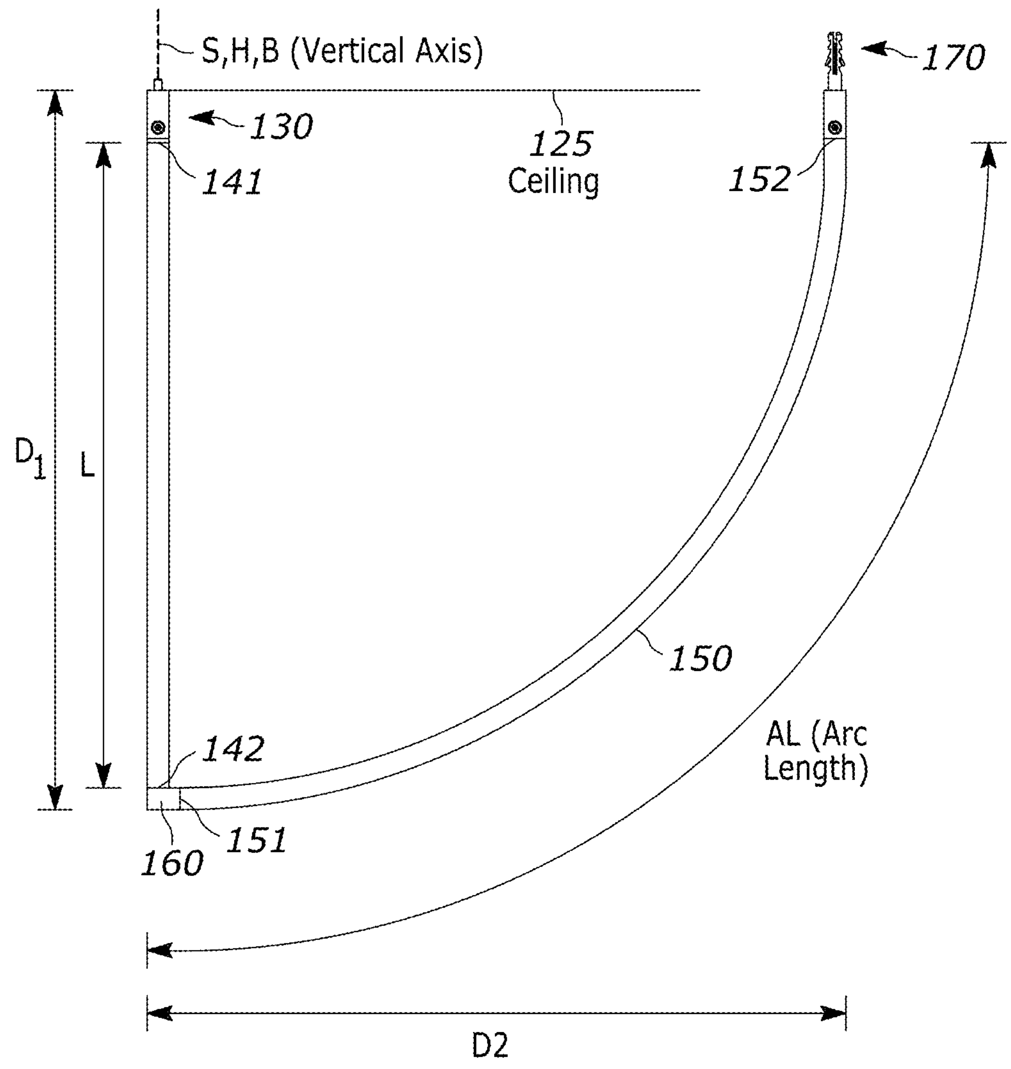
FIG. 5 is a front view of the lighting fixture of FIG. 4.

In some examples, the modular lighting system 100 may include multiple rigid stems 140, multiple curved arms 150, and one or more extender stems 180, 190 that can be combined or interchanged to arrive at one or more different lighting fixtures. For example, these components can be combined or interchanged to create the desired aesthetics in the environment and/or allow for customization of individual lighting fixtures 120 in the modular lighting system 100 (and in the environment). Such a modular lighting system 120 may be made and delivered as a kit with the multiple rigid stems 140, curved arms 150, and transitional fittings 160. Each rigid stem 140 in the kit has a length measured from the proximal end to the distal end, and each curved arm 140 in the kit has a length (arc length) measured from the first end to the second end. A first rigid stem 140 and a first curved arm 150 may be coupled together to create a base, or standard, configuration. This base configuration may be altered by exchanging the first rigid stem with a second rigid stem, with the length of the second rigid stem varying from that of the first rigid stem. Alternatively, or additionally, the base configuration may be altered by exchanging the first curved arm 150 with a second curved arm 150 which differs in length from the first curved arm 150. These altered configurations may change the distance between lighting fixture components relative to each other and/or relative to the ceiling. Further, as illustrated in FIGS. 3B and 15, each junction box 110 may include, or attach to, an electrical line or wire 111 that passes through the stem fixture assembly 130 and the rigid stem 140 (and, more particularly, the connecting rod 143) to provide electricity to the lighting array 158 of the lighting fixture 120. As described with respect to FIG. 3, the electrical line 111 may attach to a lighting fixture 120 with a rigid stem 140 which is secured to the ceiling at a point away from a junction box that supports other lighting fixtures in a lighting system.

FIG. 16 offers a more detailed view of the extending stems 180 illustrated in FIGS. 2A and 2B and briefly discussed above. As briefly discussed above, these stems 180 can be attached to each other and/or to the rigid stem 140 of one of the lighting fixtures 120. As illustrated in FIG. 16, each extending stem 180 has an outer portion or housing 1600, a bushing 1604, a connecting rod 1608, and one or more threaded nuts 1612. The bushing 1604 is similar in structure and configuration to that of the bushing 236 and the bushing 354 described above and can be coupled to and disposed at one end of the housing 1600. Like the connecting rod 143, the connecting rod 1608 extends from the bushing 1604 through the center of the housing 1600, such that the housing 1600 surrounds the rod 1608. At the end of the rod 1608 that terminates at the bushing 1604, one of the threaded nuts 1612 is partially disposed in the bushing 1604 and screws onto the rod 1608. The opposite end of the rod 1608, the end that is not capped by the bushing 1604, may have another threaded nut 1612 affixed thereto. In some examples, this additional threaded nut 1612 joins the rod 1608 of a first extending stem 180 to the rod 1608 of a second extending stem 180. The connection between the rods 1608 of linked or joined extending stems 180 aids in the physical securement of one extending stem 180 to another extending stem 180, as well as provides a path for wiring, such as electrical wiring (e.g., electrical line 111), which pass through the lighting fixture 120 coupled to the extending stems 180.

Securing fasteners, similar to the screws 366 of the securing assembly 170, also contribute to the securement of adjacent extending stems 180 by fixing a portion of the housing 1600 of the first extending stem 180 to the bushing 1604 of the second extending stem 180. In any event, use of one of the extending stems 180 may in turn increase the distance between the ceiling 125 and the proximal end 141 of the lighting fixture 120, and joining multiple extending stems 180 together increases the distance from the ceiling 125 and the proximal end 141 of the lighting fixture 120 even more. It will be appreciated that the increase in the distance between the ceiling 125 and the proximal end 141 of the rigid stem 140 corresponds to an increase in the distance from the ceiling 125 to the transitional fitting 160 and the curved arm 150. While not illustrated herein, it will be appreciated that the extending stems 190 are structurally similar to the extending stems 180 but are instead attachable to the curved arm 150 to change the distance between the ceiling 125 and the second end 152 of the curved arm 150. The extending stems 180, 190 may be provided in a lighting fixture 120 or a lighting system 100 such that the extending stems 180, 190 are of uniform length (e.g., 12 inches (30.5 cm)) or of various lengths (e.g., 6 inches (15.25 cm) and 12 inches (30.5 cm)). The ability to vary not only the number of extending stems used, but also the type/length of each extending stem allows for a myriad of combinations and configurations for a lighting fixture, as well as for a lighting system composed of multiple lighting fixtures.

In the ways described above, by taking a basic lighting fixture configuration and exchanging rigid stems, curved arms, transitional fittings, and/or adding or subtracting extending stems, lighting fixtures (and lighting systems more generally) can be created to suit any preferences or requirements (e.g., aesthetic requirements) for the environment surrounding the lighting fixture(s). Such lighting systems may be sold as kits having multiple rigid stems and curved arms, and optionally additional transitional fittings and extending stems. Each lighting fixture in a lighting system may be unique and different from others in the system or each lighting fixture may be similar and arranged juxtaposed to and/or spaced apart from each other to create a desired lighting system.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

The invention claimed is:

1. A modular lighting system, the system comprising:

a lighting fixture, comprising:

a stem fixture assembly adapted to connect to a junction box mounted to a ceiling;

a rigid stem having a proximal end and a distal end, the rigid stem having a first length measured from the proximal end to the distal end;

a curved arm housing one or more first lighting elements that face upwards, towards the stem fixture assembly, the curved arm having a first end and a second end and having a first arc length measured from the first end to the second end; and a transitional fitting operable to join the distal end of the rigid stem to the first end of the curved arm;

a second rigid stem having a second length different from the first length;

a second curved arm housing one or more second lighting elements and having a second arc length different from the first arc length;

wherein the rigid stem is interchangeable with the second rigid stem, wherein interchanging the rigid stem with the second rigid stem changes a distance between the first end of the curved arm and the ceiling, and wherein the curved arm is interchangeable with the second curved arm such that the one or more second lighting elements face upwards, towards the stem fixture assembly, wherein interchanging the curved arm with the second curved arm changes a distance between the second end of the curved arm and the rigid stem.

2. The system of claim 1, wherein the transitional fitting is welded to the first end of the curved arm.

3. The system of claim 1, further comprising a third rigid stem having a third length different from the first length and the second length, wherein the rigid stem is interchangeable with the third rigid stem, thereby changing the distance between the first end of the curved arm and the ceiling, and wherein the curved arm is interchangeable with a third curved arm having a third arc length different from the first arc length and the second arc length, thereby changing the distance between the second end of the curved arm and the rigid stem.

4. The system of claim 1, further comprising a first set of extension stems attachable to the stem fixture assembly and the proximal end of the rigid stem to increase the distance between the first end of the curved arm and the ceiling; and a second set of extension stems attachable to the second end of the curved arm to increase a distance between the second end of the curved arm and the ceiling.

5. The system of claim 1, further comprising: a diffuser at least partially disposed in a cavity in the curved arm; and an array of the one or more first lighting elements coupled to a bottom wall of the curved arm such that the array is disposed in the cavity between the diffuser and the bottom wall.

6. The system of claim 1, further comprising a standoff fastener attached to the second end of the curved arm, the standoff fastener configured to join the second end of the curved arm to the ceiling.

7. The system of claim 1, further comprising a connecting rod configured to attach the rigid stem to the stem fixture assembly, the connecting rod extending entirely through the rigid stem.

8. The system of claim 7, the stem fixture assembly comprising a bushing at the proximal end of the rigid stem, the bushing sized to receive a portion of the connecting rod housed within the rigid stem, the bushing configured to join the rigid stem to the stem fixture assembly.

9. A lighting fixture configured to be connected to a ceiling, the lighting fixture comprising:

a rigid stem having a proximal end and a distal end, the rigid stem having a first length measured from the proximal end to the distal end;

a curved arm housing one or more lighting elements that face upwards, towards the stem fixture assembly, the curved arm having a first end and a second end and having a first arc length measured from the first end to the second end; and a transitional fitting operable to join the distal end of the rigid stem to the first end of the curved arm;

wherein the rigid stem is interchangeable with a second rigid stem with a second length different from the first length, wherein interchanging the rigid stem with the second rigid stem changes a distance between the first end of the curved arm and the ceiling, and wherein the curved arm is interchangeable with a second curved arm housing one or more second lighting elements such that the one or more second lighting elements face upwards, wherein interchanging the curved arm with the second curved arm changes a distance between the second end of the curved arm and the rigid stem.

10. The lighting fixture of claim 9, wherein the transitional fitting comprises a vertical portion and a horizontal portion, the vertical portion configured to be disposed within the distal end of the rigid stem and the horizontal portion coupled to the first end of the curved arm.

11. The lighting fixture of claim 10, wherein the horizontal portion is welded to the first end of the curved arm.

12. The lighting fixture of claim 10, wherein horizontal portion comprises one or more insertion prongs configured to be disposed in one or more openings, respectively, formed in the curved arm.

13. The lighting fixture of claim 12, further comprising: a diffuser at least partially disposed in a cavity in the curved arm; and an array of the one or more first lighting elements coupled to a bottom wall of the curved arm such that the array is disposed in the cavity between the diffuser and the bottom wall, wherein the one or more openings are defined between the diffuser and one or more side walls of the curved arm.

14. The lighting fixture of claim 10, further comprising: a diffuser at least partially disposed in a cavity in the curved arm; and an array of the one or more first lighting elements coupled to a bottom wall of the curved arm such that the array is disposed in the cavity between the diffuser and the bottom wall.

15. The lighting fixture of claim 10, further comprising a stem fixture assembly adapted to removably connect the rigid stem to a junction box mounted to the ceiling.

16. The lighting fixture of claim 15, further comprising a connecting rod configured to attach the rigid stem to the stem fixture assembly, the connecting rod extending entirely through the rigid stem.

17. The lighting fixture of claim 10, further comprising a standoff fastener attached to the second end of the curved arm, the standoff fastener configured to join the second end of the curved arm to the ceiling.

18. A lighting fixture configured to be connected to a ceiling, the lighting fixture comprising:

a rigid stem having a proximal end and a distal end, the rigid stem having a first length measured from the proximal end to the distal end;

a curved arm housing one or more lighting elements that face upwards, towards the stem fixture assembly, the curved arm having a first end and a second end and having a first arc length measured from the first end to the second end; and a transitional fitting operable to join the distal end of the rigid stem to the first end of the curved arm;

wherein the rigid stem is interchangeable with a second rigid stem with a second length different from the first length, wherein interchanging the rigid stem with the second rigid stem changes a distance between the first end of the curved arm and the ceiling, and wherein the curved arm is interchangeable with a second curved arm housing one or more second lighting elements such that the one or more second lighting elements face upwards, wherein interchanging the curved arm with the second curved arm changes a distance between the second end of the curved arm and the rigid stem, and wherein the transitional fitting comprises one or more insertion prongs configured to be removably disposed in one or more openings, respectively, formed in the curved arm.

19. The lighting fixture of claim 18, wherein the transitional fitting comprises a vertical portion and a horizontal portion, the vertical portion configured to be disposed within the distal end of the rigid stem and the horizontal portion coupled to the first end of the curved arm, and the horizontal portion comprising the one or more insertion prongs.

20. The lighting fixture of claim 18, further comprising: a diffuser at least partially disposed in a cavity in the curved arm; and an array of the one or more first lighting elements coupled to a bottom wall of the curved arm such that the array is disposed in the cavity between the diffuser and the bottom wall, wherein the one or more openings are defined between the diffuser and one or more side walls of the curved arm.

* * * * *